US012574116B2

(12) United States Patent
Quintana Sanchez et al.

(10) Patent No.: US 12,574,116 B2
(45) Date of Patent: Mar. 10, 2026

(54) FREE SPACE OPTICAL COMMUNICATIONS TERMINAL

(71) Applicant: AIRBUS (S.A.S.), Blagnac (FR)

(72) Inventors: Crisanto Quintana Sanchez, Bristol (GB); Gavin Erry, Bristol (GB); Yoann Thueux, Bristol (GB)

(73) Assignee: AIRBUS (S.A.S.), Blagnac (FR)

( * ) Notice: Subject to any disclaimer, the term of this patent is extended or adjusted under 35 U.S.C. 154(b) by 238 days.

(21) Appl. No.: 18/477,320

(22) Filed: Sep. 28, 2023

(65) Prior Publication Data

US 2024/0113779 A1     Apr. 4, 2024

(30) Foreign Application Priority Data

Sep. 30, 2022     (GB) ...................................... 2214397

(51) Int. Cl.
| | |
|---|---|
| *H04B 10/112* | (2013.01) |
| *H04B 10/50* | (2013.01) |
| *H04B 10/532* | (2013.01) |
| *H04B 10/61* | (2013.01) |

(52) U.S. Cl.
CPC ....... *H04B 10/1123* (2013.01); *H04B 10/501* (2013.01); *H04B 10/532* (2013.01); *H04B 10/614* (2013.01)

(58) Field of Classification Search
None
See application file for complete search history.

(56) References Cited

U.S. PATENT DOCUMENTS

| | | | | |
|---|---|---|---|---|
| 3,741,657 A | * | 6/1973 | Andringa | ................ G01P 3/366 |
| | | | | 356/467 |
| 5,349,176 A | * | 9/1994 | Czichy | .................... G01S 3/786 |
| | | | | 250/208.2 |
| 5,473,465 A | * | 12/1995 | Ye | ......................... G02B 5/3083 |
| | | | | 359/251 |
| 6,108,120 A | | 8/2000 | Kawai et al. | |
| 6,327,063 B1 | * | 12/2001 | Rockwell | ............. H04B 10/118 |
| | | | | 398/128 |
| 6,437,904 B1 | | 8/2002 | Reeder | |
| 6,490,070 B1 | * | 12/2002 | Adams | ............... H04B 10/1121 |
| | | | | 398/131 |
| 6,535,314 B1 | * | 3/2003 | Mendenhall | ......... H04B 10/118 |
| | | | | 398/121 |

(Continued)

FOREIGN PATENT DOCUMENTS

| | | |
|---|---|---|
| CN | 210780813 U | 6/2020 |
| JP | 2007127988 A | 5/2007 |

(Continued)

OTHER PUBLICATIONS

Combined Search Report and Examination Report for GB2214397.8 dated Mar. 31, 2023, 6 pages.

*Primary Examiner* — Jai M Lee
(74) *Attorney, Agent, or Firm* — Nixon & Vanderhye P.C.

(57) ABSTRACT

A free space optical communications terminal (100) including an optical arrangement of a quarter-wave plate (105), a Faraday rotator (110), a polarisation splitter (115), a first arm (120) comprising a receiver (126) and a transmitter (128), and a second arm (130) comprising a component (132) configured to utilise a received beam. The optical arrangement apportions a circularly polarised beam between the first and second arm.

15 Claims, 9 Drawing Sheets

(56) References Cited

U.S. PATENT DOCUMENTS

| | | | |
|---|---|---|---|
| 6,717,713 B2 | 4/2004 | Onaka et al. | |
| 6,717,730 B2 | 4/2004 | Terahara et al. | |
| 6,718,082 B2 | 4/2004 | Zhao et al. | |
| 6,798,566 B2 | 9/2004 | Abe et al. | |
| 6,867,895 B2 | 3/2005 | Nagaeda | |
| 6,975,454 B1 * | 12/2005 | Yan | G02B 6/2793 |
| | | | 359/486.03 |
| 11,133,873 B1 * | 9/2021 | Kowalevicz | H04B 10/615 |
| 11,190,293 B1 * | 11/2021 | Ducellier | H04J 14/0227 |
| 11,595,129 B2 * | 2/2023 | Kowalevicz | H04B 10/40 |
| 2006/0038999 A1 * | 2/2006 | Hentschel | G01J 4/04 |
| | | | 356/364 |
| 2022/0271838 A1 * | 8/2022 | Becker | H04B 10/1123 |
| 2023/0087573 A1 * | 3/2023 | Kowalevicz | H04B 10/614 |
| | | | 359/484.02 |

FOREIGN PATENT DOCUMENTS

| | | | |
|---|---|---|---|
| JP | 6130339 A | 5/2017 | |
| WO | 2022/108636 A1 | 5/2022 | |
| WO | 2022178430 A1 | 8/2022 | |

* cited by examiner

Figure 10

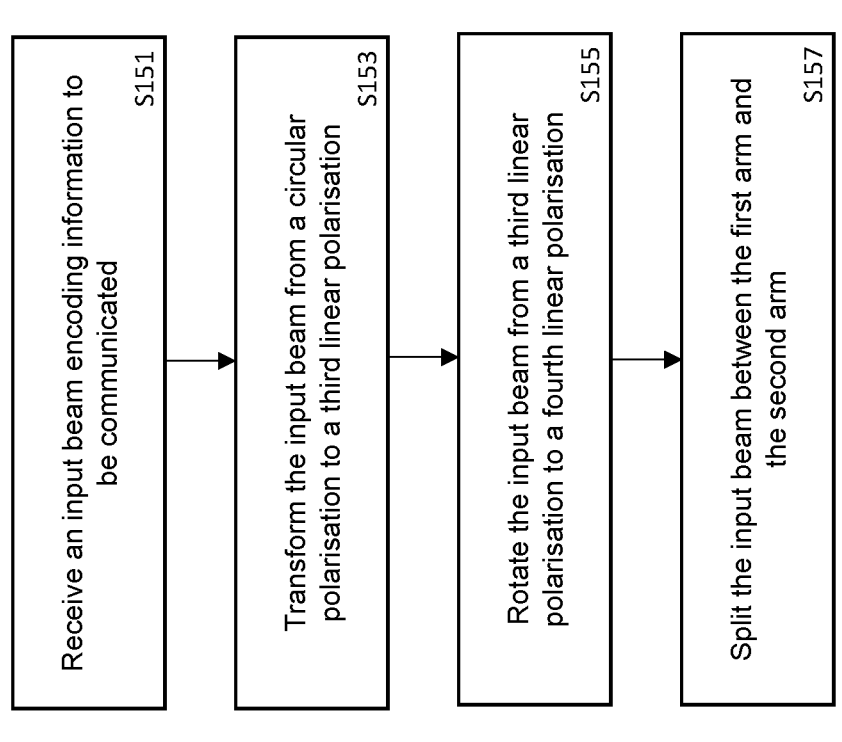

Receive an input beam encoding information to be communicated — S151

Transform the input beam from a circular polarisation to a third linear polarisation — S153

Rotate the input beam from a third linear polarisation to a fourth linear polarisation — S155

Split the input beam between the first arm and the second arm — S157

Figure 9

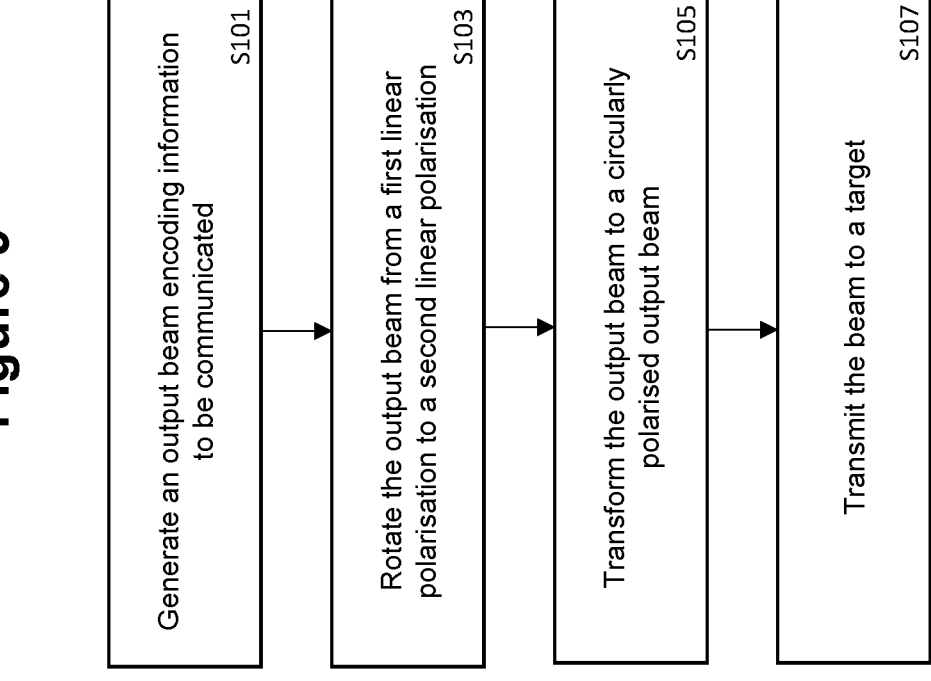

Generate an output beam encoding information to be communicated — S101

Rotate the output beam from a first linear polarisation to a second linear polarisation — S103

Transform the output beam to a circularly polarised output beam — S105

Transmit the beam to a target — S107

FREE SPACE OPTICAL COMMUNICATIONS TERMINAL

RELATED APPLICATION

This application incorporates by reference and claims priority to United Kingdom patent application GB 2214397.8, filed Sep. 30, 2022.

TECHNICAL FIELD

The present invention relates to free space optical communications terminals and methods of operating free space optical communications terminals.

BACKGROUND

Free space optical (FSO) communications use light propagating in free space to transmit data. In the context of FSO communications, 'free space' refers to, for example, air, space, vacuum, or similar and is in contrast with communications via solids such as a fibre-optic cable. FSO communications ordinarily rely on direct line of sight between transmitter and receiver and so rely on directing an optical beam between FSO communication terminals FSO communications can be useful for example in cases where communication via physical connections, such as fibre optic cables or other data cables, is impractical. One such case is, for example, communications between an aircraft such as a drone and a ground-based terminal.

FSO communications can offer higher data rates and improved security as compared to other wireless communication techniques. For example, FSO communications can achieve higher data rates, and can be less susceptible to jamming and interception compared to radio frequency (RF) communications.

It is desirable to allow for a reduction in the size, weight, and power (SWaP) requirements of a FSO communications terminal.

SUMMARY

According to a first aspect of the present invention, there is provided a free space optical communications terminal comprising, along a principal axis thereof: a quarter-wave plate, a Faraday rotator, a polarisation splitter, a first arm comprising a receiver and a transmitter, and a second arm comprising a component configured to utilise a received beam. The quarter-wave plate, the Faraday rotator, and the polarisation splitter are configured such that: for a received circularly polarised beam incident on the quarter-wave plate, the quarter-wave plate converts the received circularly polarised beam to a received linearly polarised beam; the Faraday rotator rotates the polarisation of the received linearly polarised beam to produce a rotated received linearly polarised beam; and the polarisation splitter provides a first portion of the rotated received linearly polarised beam to the first arm and a second portion of the rotated received linearly polarised beam to the second arm. For a transmitted beam produced by the transmitter of the first arm and incident on the polarisation splitter, the polarisation splitter provides a transmitted linearly polarised beam to the Faraday rotator; the Faraday rotator rotates the polarisation of the transmitted linearly polarised beam to produce a rotated transmitted linearly polarised beam; and the quarter-wave plate converts the rotated transmitted linearly polarised beam to an output beam with an output polarisation.

In use, the terminal may receive circularly polarised light and split the received light between two arms of the terminal, and send light, produced by a transmitter in the first arm of the terminal, having an output polarisation such as circular polarisation. Accordingly, a component in the second arm can utilise the received beam, but the transmitter and the receiver are provided in the same, first, arm. The transmitter and receiver being provided in the same arm can, in turn, allow for the size, weight, and power requirements of the terminal to be reduced, as, for example, optical elements such as collimation optics and relay optics can be common to both the transmitter and receiver, and may be shortened to improve system integration even further. For example, beam tracking and steering control, such as fine steering provided by a fast-steering mirror, can be common to both the transmitter and receiver if the received beam and the transmitted beam follow substantially similar paths. In combining the transmitter and receiver arms such that they utilise a single aperture and thereby share parts of the optical steering system, the system size, weight, and power requirements of the terminal can be minimised.

In examples, the quarter-wave plate, the Faraday rotator, and the polarisation splitter are configured such that the output polarisation is circular. The output polarisation being circular means that the incoming polarisation for a receiving terminal is invariant with the spatial orientation of the receiving terminal, which can permit flexibility and robustness for a free space optical communications network. In examples, the received circularly polarised beam may be one of left and right circular polarisation and the output polarisation may be the other one of left and right circular polarisation.

In examples, the quarter-wave plate, the Faraday rotator, and the polarisation splitter are configured such that the first received portion provided to the first arm and the second received portion provided to the second arm are equal.

In examples, the component configured to utilise the received beam is a beam position sensing detector. In some examples, the beam position sensing detector is a quadrant tracking detector. This can allow the spatial position of the incoming beam to be tracked which can improve the performance of the terminal at receiving the incoming beam. It can be difficult to integrate a beam position sensing detector into a fibre optic cable. Accordingly, where the first arm is integrated in fibre, it can be useful that the received light is also provided to the second arm to allow components that are difficult to integrate into fibre optic cables to utilise the received light.

In examples, the first arm further comprises an optical circulator, the transmitter configured to address a first port of the optical circulator, the polarisation splitter configured to address a second port of the optical circulator, and the receiver configured to address a third port of the optical circulator. In use, light received by the first arm is directed by the optical circulator to the optical detector; and light produced by the optical source is directed by the optical circulator to the polarisation splitter. In this way, the receiver can be optically isolated from the transmitter, which can permit their concurrent use, which can improve performance by, for example, improving data communication rates of the terminal. In further examples, the optical circulator is a fibre-optic circulator, and the optical source and detector are coupled to their respective ports of the fibre-optical circulator by optical fibre, permitting the first arm to be highly fibre-integrated which can further reduce size and weight of the terminal.

In examples, the polarisation splitter is a polarising beam splitter. In examples, the receiver is an optical detector. In examples, the transmitter is an optical laser source, such as an in-fibre laser source.

In examples, the quarter-wave plate is rotatably mounted such that the rotational alignment of a fast axis of the quarter-wave plate can be varied. In examples, the Faraday rotator is controllable to vary the ratio of light between the first portion and the second portion. This can improve the performance of the terminal by allowing incoming light to be apportioned dynamically according to the requirements of each arm. In some examples, the Faraday rotator comprises an electromagnetic element, wherein the strength of a magnetic field applied by the electromagnetic element can be varied such that a rotation imparted by the Faraday rotator on incident light is varied. This can allow for the ratio of light between the first and second portion to be modified via electrical control of the Faraday rotator. In some examples, the fast axis of the quarter-wave plate is maintained at a fixed rotational displacement from the output polarisation of the Faraday rotator. This can allow the output polarisation of the terminal to remain constant as the ratio of received light between the first portion and the second portion is varied, which can further improve performance and flexibility of the terminal.

In some examples, the ratio of received light between the first port and the second port is varied according to a stage of link establishment. For example, at an acquisition stage the first portion receives less light than the second portion, and at a data transfer stage, the first portion receives an equal portion of, or more, received light than the second portion.

In some examples, the fast-axis of the quarter-wave plate is aligned ±45 degrees from the polarisation direction of the output of the Faraday rotator, the rotated transmitted linearly polarised beam. This can allow the quarter-wave plate to produce circularly polarised light as a transmitted beam as the Faraday rotator is varied to vary the split ratio between the first and second arm. In examples where the Faraday rotator comprises an electromagnet, the position of the quarter-wave plate may be configured dependent on the strength of the magnetic field applied by the electromagnetic element, the magnetic field defining the output polarisation of the Faraday rotator.

In some examples, the free space optical communications terminal further comprises beam steering means configured to modify a beam path through the terminal. In some examples, the beam position sensing detector is configured to provide steering information, and the beam steering means is configured to use the steering information to modify the beam path through the terminal. This can improve the performance of the terminal at receiving the incoming beam by performing more accurate steering of the beam. In further examples, the beam steering comprises fine beam steering in the first arm. This can allow fine steering of the beam into the receiver, which can further improve performance of the terminal at receiving the incoming beam.

According to a second aspect of the invention, there is provided a free space optical communications system comprising a plurality of the free space optical communications terminal according to the aforementioned examples. Such a plurality of the free space optical communications terminals according to the aforementioned examples can form nodes of a communications network. In such a network, all the nodes may be identical which can allow the network to be straightforwardly scaled.

According to a third aspect of the invention, there is provided a vehicle comprising a free space optical communications terminal according to the first or second aspect. In some examples, the vehicle is an aircraft and/or spacecraft. The reduction in size, weight and power requirements may be particularly important when applied to a vehicle such as an aircraft and/or spacecraft, such as a drone or satellite.

According to a fourth aspect of the present invention, there is provided a method for free space optical communications, the method for use with a terminal according to the present invention comprising a quarter-wave plate; a Faraday rotator; a polarisation splitter; a first arm comprising a receiver and a transmitter; and a second arm comprising a component configured to utilise a received beam; the method comprising: generating, using the transmitter, an output beam of light encoding information to be communicated, the output beam having a first linear polarisation; rotating, using the Faraday rotator, the output beam from a first linear polarisation to a second linear polarisation; and transforming, using the quarter-wave plate, the output beam from a second linear polarisation to a third polarisation to be transmitted to a target; and receiving an input beam of light encoding information to be communicated, the input beam having a fourth polarisation; transforming, using the quarter-wave plate, the input beam from a fourth polarisation to a fifth polarisation; rotating, using the Faraday rotator, the input beam from a fifth polarisation to a sixth polarisation; splitting, using the polarisation splitter, the input beam between the first arm and the second arm and receiving a portion of the input beam at the receiver.

In examples, the third polarisation is a circular polarisation. In other examples, the fourth polarisation is a circular polarisation. In other examples still, the fifth and sixth polarisations are linear polarisations. In further examples still, the method further comprises transforming, using the quarter-wave plate, and rotating, using the Faraday rotator, the input beam to change the ratio of input beam split between the first arm and the second arm.

Further features and advantages of the invention will become apparent from the following description of preferred embodiments of the invention, given by way of example only, which is made with reference to the accompanying drawings.

BRIEF DESCRIPTION OF THE DRAWINGS

FIG. 9 is a flow diagram illustrating a method of operating a terminal according to the present invention in a transmit direction according to an example;

FIG. 10 is a flow diagram illustrating a method of operating a terminal according to the present invention in a receive direction according to an example.

DETAILED DESCRIPTION

Figure 1:
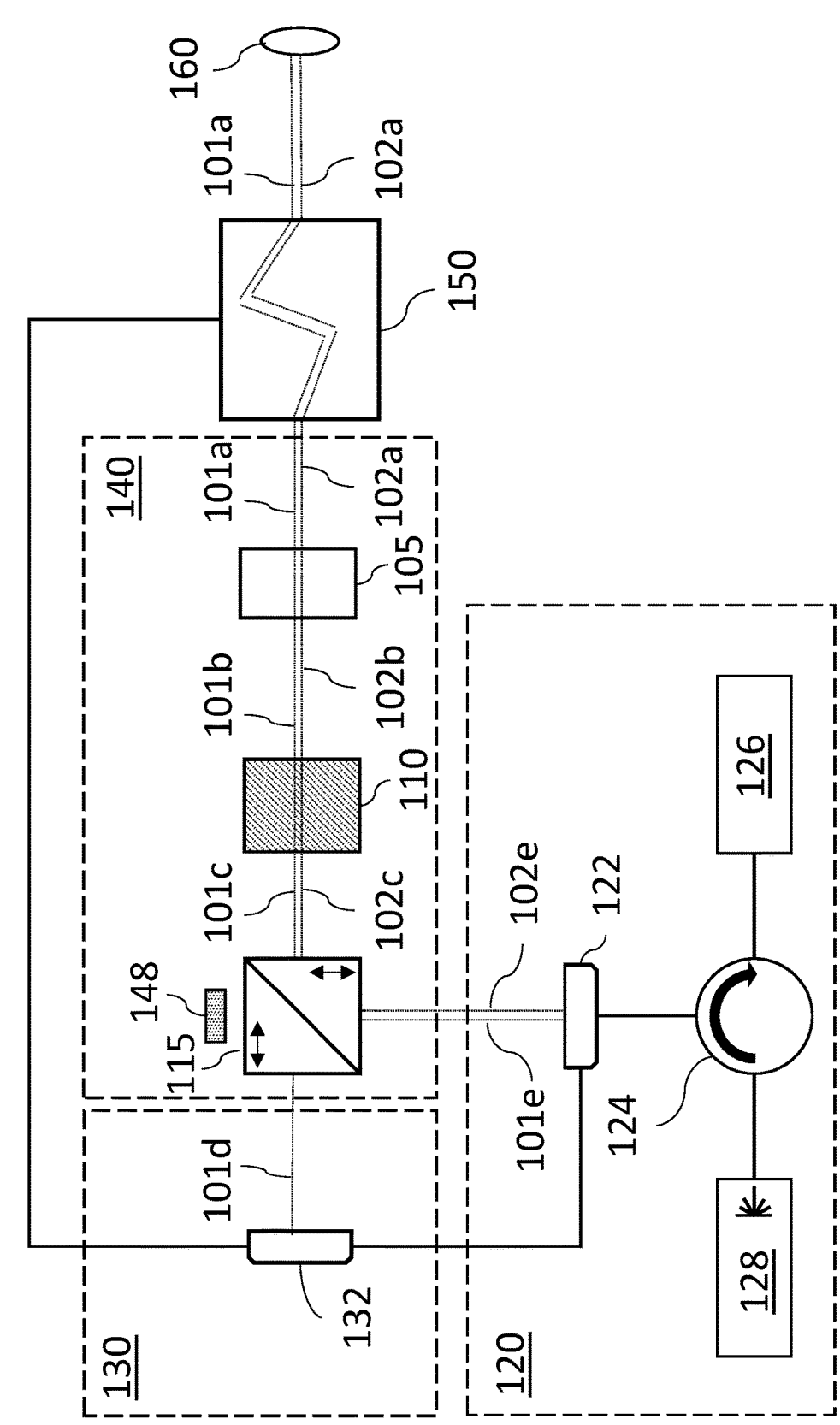
FIG. 1 is a schematic diagram of an exemplary free space optical communications terminal according to the present invention.

FIG. 1 shows an exemplary free space optical (FSO) communications terminal 100 comprising, along an optical axis of the communications terminal 100, a pointing unit 150 and a polarisation rotation arrangement 140 comprising a quarter-wave plate 105, a Faraday rotator 110, and a polarising beam splitter 115. A first arm 120 is arranged to address a first interface of the polarising beam splitter 115 and a second arm 130 is arranged to address a second interface of the polarising beam splitter 115.

An input electromagnetic beam 101*a-e* and an output electromagnetic beam 102*a-e* are depicted to illustrate paths of light along the optical axis of the communications terminal 100. The input beam 101*a-e* and output beam 102*a-e* can be regarded as co-linear, that is, the beams propagate along the same optical path but in opposite propagation directions.

The pointing unit 150 is configured to steer the input beam 101*a* from an external target 160 along the optical axis of the communications terminal 100, providing the steered input beam 101*a* to the polarisation rotation arrangement 140. Likewise, the pointing unit 150 is configured to receive the output beam 102*a* from the polarisation rotation arrangement 140 and steer the output beam 102*a* towards the external target 160. In practice, when the FSO communications terminal 100 is in two-way communications with the target 160, the input beam 101*a-e* and output beam 102*a-e* traverse substantially the same optical path, and hence the various steering and guiding arrangements in the pointing unit 150 serve to guide both output and return beams concurrently.

The first arm 120 comprises a fibre terminal 122. The fibre terminal 122 comprises a fibre-coupling arrangement, the fibre-coupling arrangement comprising a six-axis positioning stage for alignment of a lens and a fibre end. The input beam 101*e* incident upon the fibre terminal 122 is coupled into the optical fibre by the fibre-coupling arrangement. The optical circulator 124 comprises a first port connected to a transmitter comprising a laser source 128. The fibre terminal 122 is connected to a second port of an optical circulator 124. The optical circulator 124 further comprises a third port connected to a receiver unit 126. The receiver unit 126 comprises a photodetector and an optical fibre input port and is operable to process incoming signals for communication purposes. The laser source 128 in this example is an in-line fibre laser which directly generates light into a mode of the optical fibre, but in other examples can be a separate optical source which is coupled into the optical fibre port of the optical circulator by using a fibre terminal similar to the fibre terminal 122. The laser source 128 is operable to generate outgoing signals for communication purposes. A beam dump 148 is provided at a third interface of the beam-splitter to absorb a portion of light output from the laser source 128; the role of the beam dump 148 is described in more detail in view of FIG. 3.

The second arm 130 comprises a quadrant tracking detector 132. The quadrant tracking detector 132 receives a portion of the input beam 101*d* from the polarising beam splitter 115, the portion of the input beam 101*d* having a horizontal polarisation. The quadrant detector 132 tracks the spatial position of an incident beam and is able to provide this spatial position information to, for example, a controller (not shown) controlling the pointing unit 150 and/or the fibre terminal 122, in order to assist with fine and coarse beam steering. If the target 160 moves to a new position, the quadrant tracking detector 132 detects a change in the position of beam 101*d*. As a result of this change, the quadrant tracking detector 132 communicates to the controller the necessary adjustments needed of the pointing unit 150, such that the terminal 100 continues to receive the beam.

The polarising beam splitter 115 splits light into a vertical linear polarisation and a horizontal linear polarisation. For brevity, these are referred to hereafter simply as "vertically polarised light" and "horizontally polarised light". A vertical polarisation is considered herein to have an orientation of polarisation orientation of 0° (or, equivalently, 180°), and a horizontal polarisation to have an orientation of polarisation orientation of 90° (or, equivalently, 270°). The polarising beam splitter can be considered to define a polarisation reference frame by provision of two orthogonal polarisation states. That is, independent of its physical orientation, the polarising beam splitter reflects a first polarisation of light from a first port and transmits an orthogonal polarisation of light from a second port. For example, the first polarisation may be described as a horizontal polarisation, but this may not correspond to a direction which might be describable as physically horizontal e.g. parallel to the horizon or the ground. The arrangement of other optical elements along the optical axis will be described relative to the reference frame of the polarising beam splitter, defined by the ports of the polarising beam splitter.

Rotating the polarisation of vertically polarised light to horizontally polarised light can therefore be described as imparting a 90° rotation on the vertically polarised light, originally at 0°, to produced horizontally polarised light, at a 90° polarisation. The polarising beam splitter 115 reflects incident light having a vertical polarisation and transmits incident light having a horizontal polarisation.

When linearly polarised light having an orientation of polarisation which is neither horizontal nor vertical, e.g. ±45°, is incident upon the polarising beam splitter 115, the polarising beam splitter will transmit a portion of the incident light as horizontally polarised light and will reflect a portion of the incident light as vertically polarised light. In the specific case of light arranged at 45° (or 135°, etc), half the incident light will be transmitted as horizontally polarised light and half the light will be reflected as vertically polarised light. For other polarisation rotations which are between 0 and 45 degrees, or 45 and 90 degrees, the portion of light transmitted will be different to the portion of light reflected. Between 0 and 45 degrees, the portion of light reflected will be larger than the portion transmitted, and between 45 and 90 degrees, the portion of light transmitted will be larger than the portion reflected.

The Faraday rotator 110 imparts a polarisation rotation on incident light. For example, a Faraday rotator configured to impart a 30-degree rotation will rotate a vertically polarised beam to a beam having a 30° orientation of polarisation. As those skilled in the art will appreciate, a Faraday rotator imparts the same rotation on incident light, regardless of propagation direction through the Faraday rotator. The beam having a 30° orientation of polarisation, upon a return journey through the Faraday rotator in the opposite propagation direction (e.g. after reflection from a mirror), would be rotated to having a 60° orientation of rotation.

In the example of FSO terminal 100, the Faraday rotator 110 comprises a magneto-optic glass element surrounded by an electromagnet (see FIG. 7 described later). The size of polarisation rotation imparted by the Faraday rotator 110, for a device of fixed length and fixed material composition, is dependent upon the strength of the magnetic field the magneto-optic glass element experiences. Through control of the power provided to the electromagnet, the Faraday rotator 110 thereby has a variable polarisation rotation. In other examples, the size of polarisation rotation may be controlled by, for example, modifying the proximity of a permanent magnet to the magneto-optic glass element.

The quarter-wave plate 105 has a fast polarisation axis and a slow polarisation axis arranged orthogonally to each other. Orientations of the quarter-wave plate 105 hereafter refer to the orientation of the fast-axis in the reference frame of the polarising beam-splitter 115. For example, the quarter-wave plate 105 being arranged at 30° means the fast axis of the quarter-wave plate 105 is arranged at 30°, unless specified otherwise. That is, in the example of FSO terminal 100, the polarising beam splitter 115 reflects a first portion of light having an orientation of polarisation of 0°, and transmits a second portion of light having an orientation of polarisation of 90°. The fast axis of the quarter-wave plate 105 being arranged at 30° means that the fast axis is oriented 30° from the polarisation of the first portion, the polarisation of the first portion being vertical, or 0°.

Light incident upon a quarter-wave plate will have its polarisation modified, the modification dependent on the orientation of the fast and slow axes relative to the orientation of polarisation of the incident light. For example, when a linearly polarised beam has an orientation of polarisation which is 45° from the orientation of the fast or slow axes, the quarter-wave plate converts the linear-polarised light to circularly polarised light. When the linearly polarised beam is aligned with either the fast or slow axis (i.e. at 0° to the slow or fast axis), there is no change to the polarisation of the beam, and it remains linearly polarised. When the linearly polarised beam is at an angle between 45° and 0° with respect to the fast or slow axes, the linearly polarised beam is converted to elliptically polarised light.

Accordingly, when circularly polarised light is incident upon the quarter-wave plate 105, linearly polarised light is produced at ±45° from the fast axis, dependent on the direction (right- or left-handed) of the circularly polarised light. When elliptically polarised light is incident upon the quarter-wave plate 105, either linearly polarised light or elliptically polarised light are generated, depending on the precise alignment of the fast axis, and the state of the elliptically polarised light.

Figure 2:
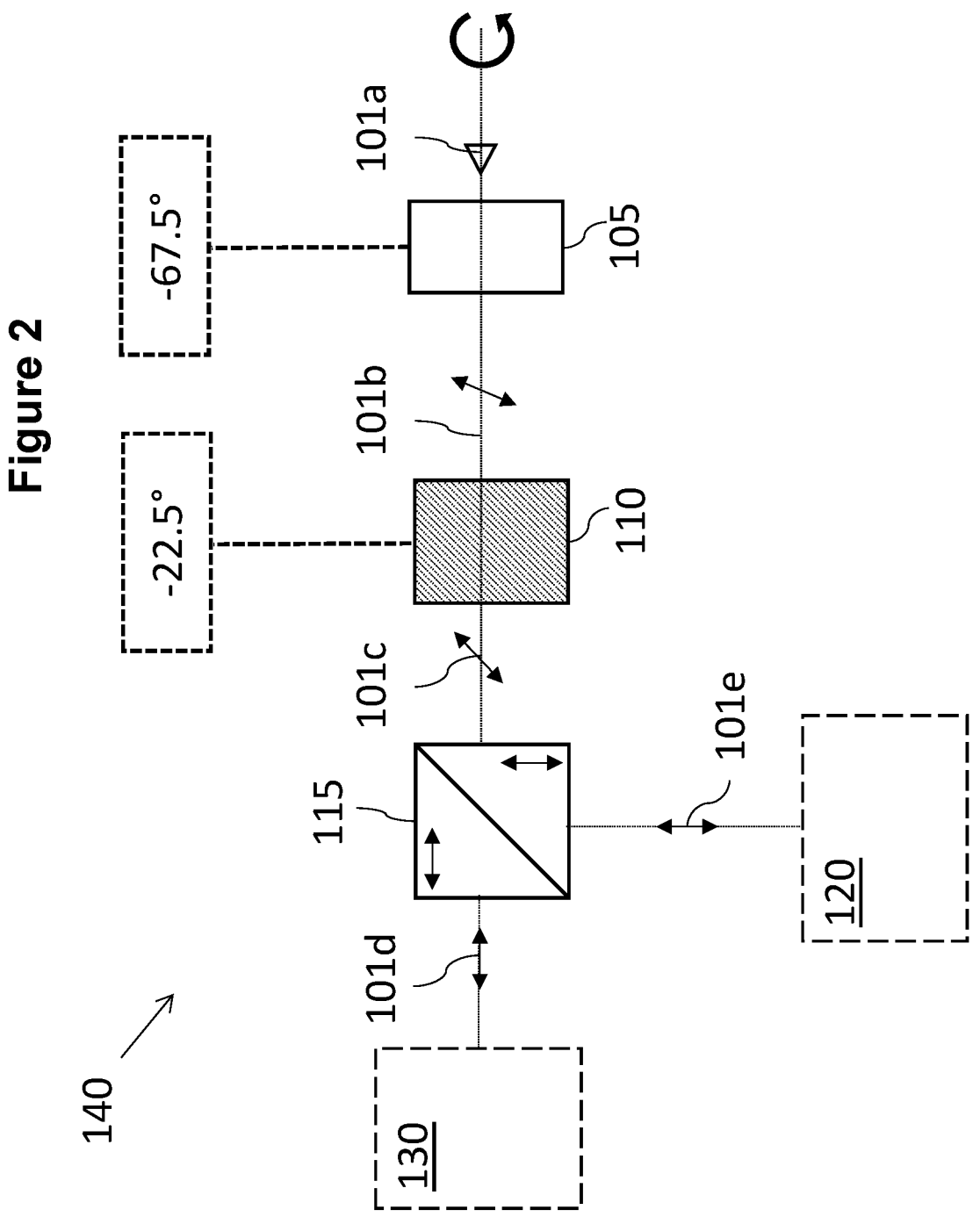
FIG. 2 is a schematic diagram illustrating the path of a received beam through the free space optical communications terminal of FIG. 1.
Figure 3:
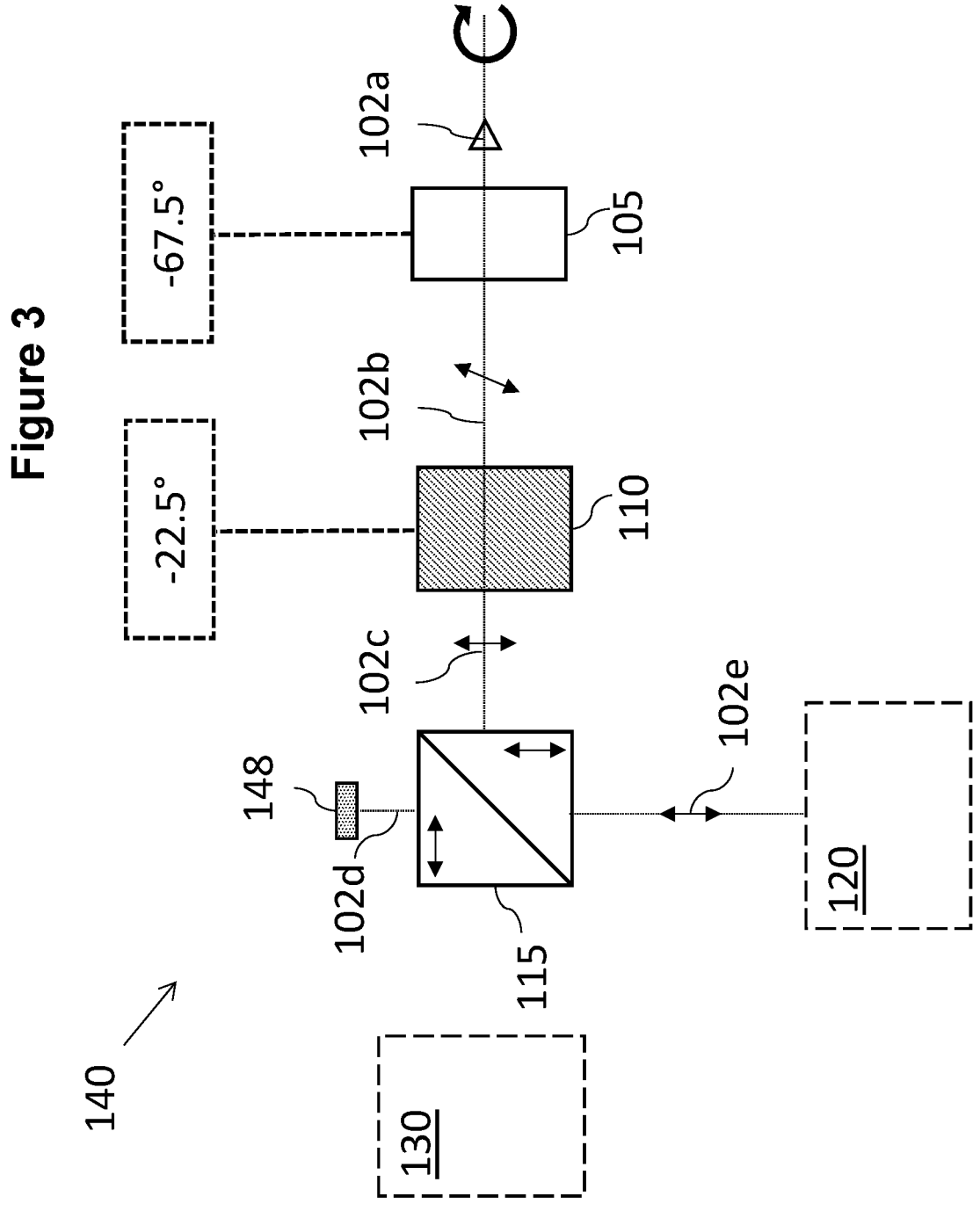
FIG. 3 is a schematic diagram illustrating the path of a transmitted beam through the free space optical communications terminal of FIG. 1.

The function of the polarising beam splitter 115, Faraday rotator 110 and quarter-wave plate 105, collectively referred to as the polarisation rotation arrangement 140, will now be explained with respect to exemplary input and output beams 101a-e, 102a-e. FIGS. 2 and 3 schematically illustrate the input beam 101a-e and the output beam 102a-e, respectively, traversing components of the polarisation rotation arrangement 140.

In FIG. 2, the input beam 101a is initially received at the quarter-wave plate 105, having been transmitted from the target 160 and steered along the optical axis by the pointing unit 150 (target 160 and pointing unit 150 not shown in FIG. 2). The input beam 101a has a left-handed circular polarisation as viewed from the receiving terminal. The quarter-wave plate is arranged at −67.5°. The circularly polarised input beam 101a is converted by the quarter-wave plate 105 to a linearly polarised input beam 101b having an orientation of polarisation of −112.5°, i.e. 45° from the fast axis of the quarter-wave plate 105.

The linearly polarised input beam 101b is then received by the Faraday rotator 110. The Faraday rotator 110 is configured to impart a rotation of −22.5° to the orientation of polarisation of the linearly polarised input beam 101b, producing a linearly polarised input beam 101c having an orientation of polarisation of −135°.

The linearly polarised input beam 101c, having an orientation of polarisation of −135°, is then incident upon the polarising beam-splitter 115. Because the orientation of polarisation is −135°, which is 45° rotated from either a vertical polarisation or a horizontal polarisation, half the incident light received at the polarising beam splitter 115 is reflected to the first arm 120 as vertically polarised beam 101e, and half the incident light is transmitted to the second arm 130 as a horizontally polarised beam 101d.

In this way, the circularly polarised input beam 101a has been split into equal portions, the first portion being provided to the first arm 120 and the second portion being provided to the second arm 130. The first arm 120 can perform a first function with the received input beam 101e, and the second arm 130 can perform a second function with the received input beam 101d.

FIG. 3 now describes the function of the polarisation rotation arrangement 140 on an output beam 102e produced by the laser source 128 of the first arm 120, the polarisation rotation arrangement being the same as that described for FIG. 2, such that the Faraday rotator induces the same rotation to the orientation of polarisation of an incident beam of light and the quarter-wave plate has the same orientation.

The output beam 102e is produced by the laser source 128. The laser source 128 produces a vertically polarised output beam 102e which is received by the polarising beam splitter 115. The polarising beam splitter reflects the vertically polarised output beam 102e as vertically polarised beam 102c.

In examples where the laser source 128 produces an output beam which isn't vertically polarised, a portion of the output beam 102e will be transmitted through the polarising beam splitter 115 as a horizontally polarised beam 102d. The beam dump 148 absorbs the transmitted horizontally polarised beam 102d. A remaining portion of the output beam 102e will be reflected by the polarising beam splitter 115 as a vertically polarised beam 102c, and so the output 102e of the laser source 128 need not necessarily be polarised in alignment with a port of the polarising beam splitter 115.

When the output 102e of the laser source 128 is linearly polarised in alignment with the vertical output port of the polarising beam splitter 115, optical loss by power dumped into the beam dump 148 is minimised, improving the brightness and efficiency of the terminal 100. In this sense, the beam dump 148 is not necessarily used because the terminal may be configured such that there is no power in horizontally polarised beam 102d, such as the laser source 128 producing vertically polarised light, but may be provided simply as a safety feature, to absorb any stray laser light.

The vertically polarised output beam 102c, reflected by the polarising beam splitter and therefore having an orientation of polarisation of 0°, then propagates through the Faraday rotator whereupon it undergoes a −22.5° rotation. It emerges from the Faraday rotator as a linearly polarised output beam 102*b* with an orientation of polarisation of −22.5°.

The linearly polarised output beam 102*b*, having an orientation of polarisation of −22.5°, is aligned 45° from the fast axis of the quarter-wave plate, which is at −67.5°. The linearly polarised output beam 102*b* is therefore converted to a circularly polarised output beam 102*a* having a right-handed circular polarisation, viewed from the reference frame of the transmitting terminal. It is desirable to transmit circularly polarised light between FSO terminals because the polarisation handedness of the transmitted light is preserved regardless of rotational orientation of the receiving FSO terminal, whereas a vertical polarisation can be received as a horizontal polarisation if the receiving terminal is rotated.

In this way, a terminal 100 comprising a polarisation rotation arrangement 140 according to the examples of FIGS. 2 and 3 can receive left-handed circularly polarised light (viewed from the reference frame of the receiving terminal) and apportion the received light equally between a first arm 120 and a second arm 130. Furthermore, the terminal 100 comprising a polarisation rotation arrangement 140 according to the examples of FIGS. 2 and 3 can transmit a right-handed circularly polarised light (viewed from the reference frame of the transmitting terminal). When a first terminal 100*a* transmits a beam of right-handed circularly polarised light, a second terminal 100*b* arranged to receive this beam will view this light as having a left-handed circular polarisation. As such, the example of FIG. 2 describes a terminal receiving light emitted by the terminal of FIG. 3, the respective polarisation rotation arrangements 140 of each terminal being identical. The terminal 100 can therefore be used to form nodes of a communication network in which every node can be the same. This can allow for the communication network to be provided in a cost-effective manner, as only one type of terminal needs to be produced to form the communication network. It can also provide for a simpler communications protocol because, whereas in a network comprises disparate nodes there may be a requirement to modify the operation of a node dependent on the receiver/sender node, in a network formed from common terminals each node of the network can be communicated with in an identical manner.

Figure 4:
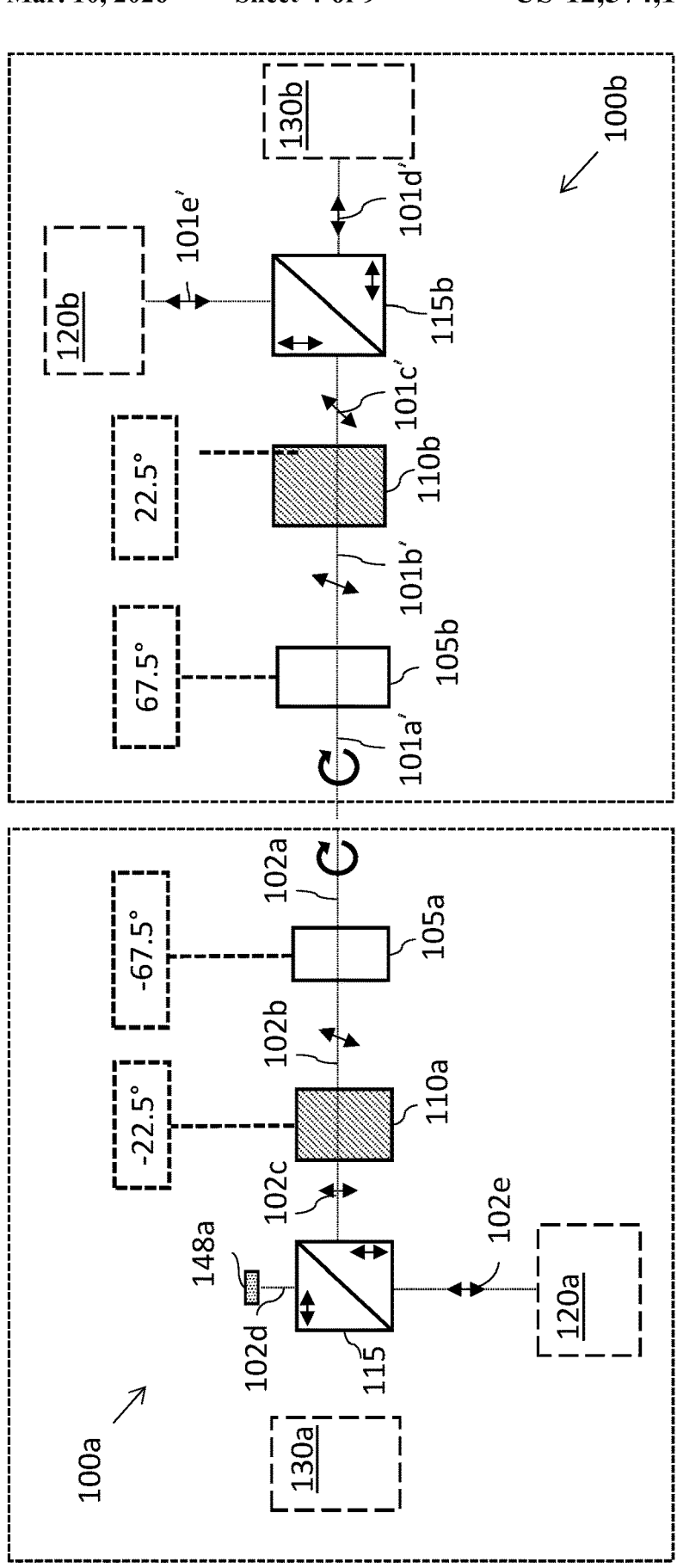
FIG. 4 is a schematic diagram illustrating a first instance of an exemplary terminal according to FIG. 1 communicating with a second instance of an exemplary terminal according to FIG. 1.

FIG. 4 illustrates schematically the combined system of a first terminal 100*a* transmitting light to a second terminal 100*b*, where both terminals comprise the polarisation rotation arrangement 140 and optical components are labelled as in FIGS. 1-3 but are suffixed with 'a' or 'b' in correspondence with their respective terminal 100*a*, 100*b*. The second terminal 100*b*, in being arranged to receive light from the first terminal 100*a*, is rotated 180-degrees relative to the first terminal 100*a*. In the example of FIG. 4, angles of polarisation and orientation are defined relative to terminal 100*a*. The terminal 100*b* therefore receives an input beam 101*a*'-*e*', which is otherwise identical to the input beam 101*a*-*e* described in FIG. 2, but the polarisation of which is described relative to terminal 100*a*; as will be clear from the following description, the outcome is equivalent despite the change in reference frame.

As described for FIG. 3, an output beam 102*a* is produced with a right-handed circular polarisation. In the reference frame of terminal 100*a*, this is received at the terminal 100*b* as an input beam 101*a*' also having a right-handed circular polarisation.

The quarter-wave plate 105*b* of the second terminal 100*b* has, in the reference frame of the first terminal 100*a*, an orientation of 67.5°, due to the aforementioned rotation of the second terminal 100*b* relative to the first terminal 100*a*. The input beam 101*a*' is therefore converted by the quarter-wave plate 105*b* of the second terminal 100*b* to a linearly polarised input beam 101*b*' having an orientation of polarisation of 112.5°.

Similarly, the Faraday rotator 110*b* of the second terminal 100*b* produces a rotation of +22.5° in the reference frame of the first terminal 100*a*. The linearly polarised input beam 101*b*' is received at the Faraday rotator 110*b* and rotated to produce a linearly polarised input beam 101*c*' which has an orientation of polarisation of 135°.

As described for FIG. 2, the linearly polarised input beam 101*c*' having an orientation of polarisation of 135° being received by the polarising beam splitter 115*b* results in a 50:50 split of the linearly polarised input beam 101*c*', where half the light is transmitted to the first arm 120*b* of the second terminal 100*b* as a vertically polarised beam 101*e*', and half the light is transmitted to the second arm 130*b* of the second terminal 100*b* as a horizontally polarised beam 101*d*'.

Figure 5:
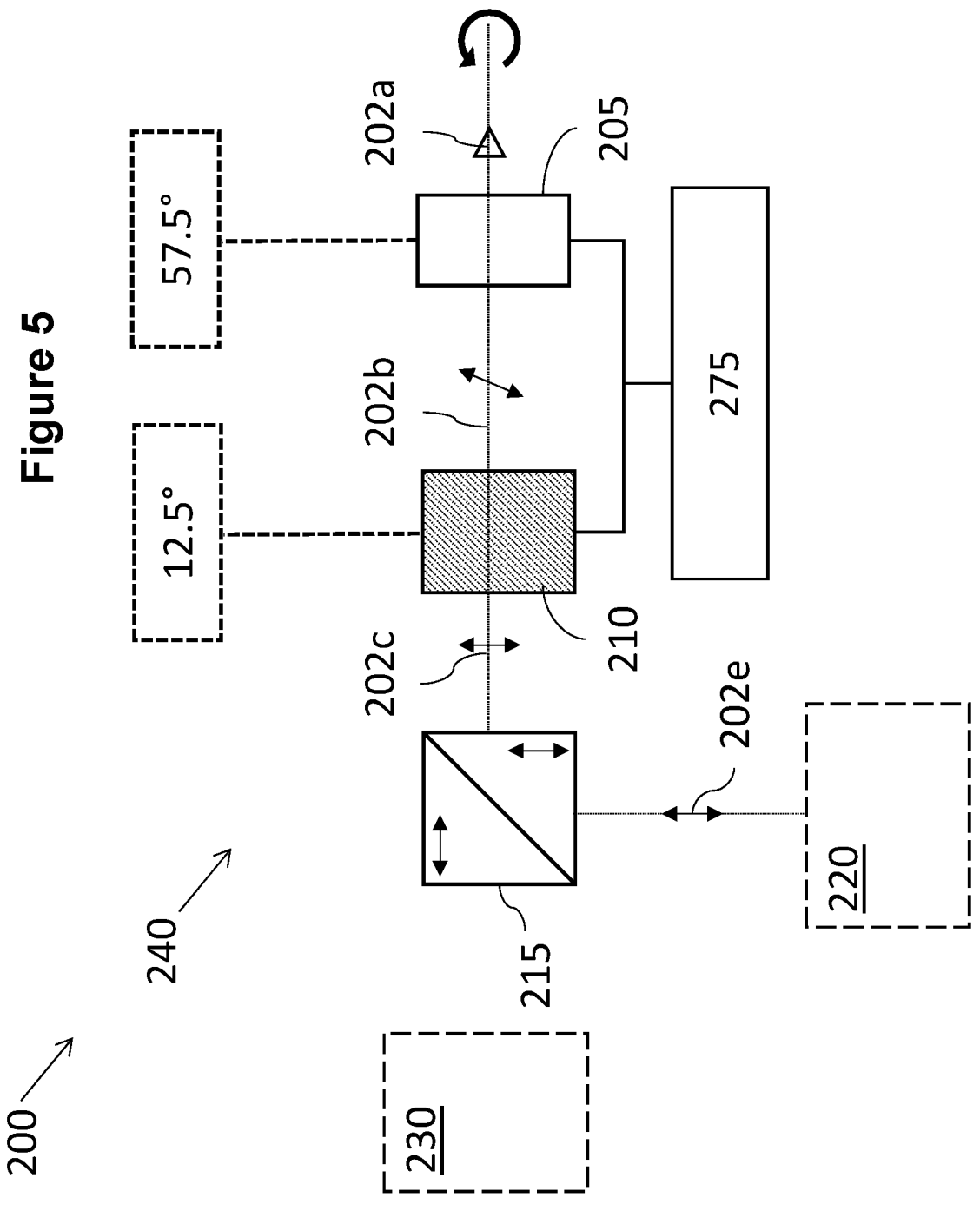
FIG. 5 is a schematic diagram illustrating the path of a transmitted beam through an exemplary free space optical communications terminal comprising a variable Faraday rotator and quarter-wave plate.
Figure 6:
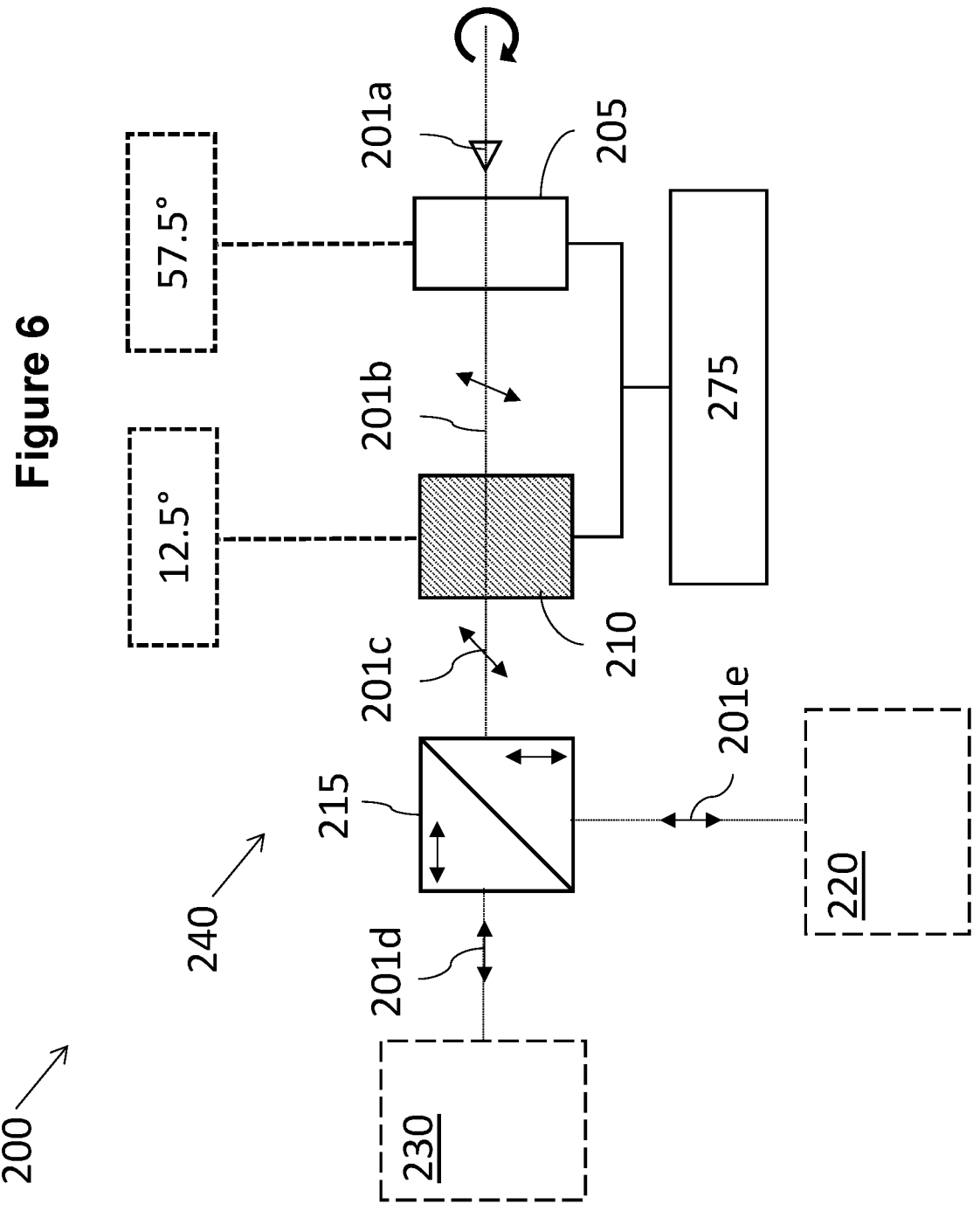
FIG. 6 is a schematic diagram illustrating the path of a received beam through the exemplary free space optical communications terminal of FIG. 5.

In the examples described so far, the polarisation rotation arrangement 140 has been configured to produce a 50:50 split of the input beam at the beam splitter, such that the first arm receives substantially the same amount of light as the second arm receives. However, it may be desirable for a different ratio of light to be provided to each arm. For example, a quadrant tracking detector provided in the second arm may require less power to function than a receiving unit provided in the first arm, and so a different division of received light between the first and second arm may be beneficial. The power requirement may be a static requirement, dictated by the component being used, or may change dynamically according to the application the terminal is being used for, or the stage of forming a communication link being undertaken. Light which is surplus to requirement in the second arm could instead be provided to the first arm if the split ratio is different, improving the performance of the terminal. Additionally, it may be desirable for the ratio of light received by the first arm and light received by the second arm to be dynamically modified. For example, a quadrant tracking detector may require larger amounts of power in order to provide positioning and fine steering for example, during the acquisition stage of forming a communication link between terminals, but may require less power once this positioning and fine steering has been achieved: for example, during the data transfer stage of a communication link, where the desired ratio between arms may return to 50:50. Different ratios may be required for different applications: for example, changes to the data rate received at a terminal can also change the power required by the receiver and hence the first arm. Again, dynamically modifying the ratio of light may permit a more efficient usage of received signal power by determining an appropriate ratio of received light between the arms of the terminal for current requirements, and updating the split ratio if the requirements of one or each arm changes. FIGS. 5 and 6 illustrate examples of terminals 200 comprising polarisation rotation arrangements 240 in which these effects are realised.

In the examples of FIGS. 5 and 6, components are labelled with reference numerals 2XX which correspond to the reference numerals 1XX used to label components of terminal 100. As for the examples of FIGS. 1-4, the Faraday rotator 210 comprises a magneto-optic glass element surrounded by an electromagnet. Through varying the power provided to the electromagnet, the rotation imparted by the Faraday rotator can be varied. Control of the Faraday rotator is provided by a controller 275. Additionally, the quarter-wave plate 205 is housed in a rotational mount driven by a motor such that its rotational orientation can be modified. Control of the quarter-wave plate 205 is provided by the controller 275.

FIG. 5 schematically illustrates the behaviour of the terminal 200 comprising polarisation rotation arrangement 240 with regard to the output light beam 201*a-e*. The polarising beam splitter 215 receives an output beam 201*e* from a laser source in the first arm 220 and reflects a portion to the vertically polarised output beam 201*c* to the Faraday rotator 210. The Faraday rotator 210 is configured by the controller 275, in this example, to impart a 12.5° rotation on the vertically polarised output beam 201*c* to produce a linearly polarised output beam 201*b* having an orientation of polarisation of 12.5°. The quarter-wave is configured by the controller 275, in this example, to have a rotational alignment of 57.5°. Because the alignment of the fast axis of the quarter-wave plate 205 is 45° from the orientation of polarisation of the output beam 201*b*, a left-handed circularly polarised output beam 201*a* is transmitted from the quarter-wave plate 205. Providing the orientation of polarisation at the output 201*b* of the Faraday rotator 210 is aligned by the controller 275 to be at ±45° to the fast axis of the quarter-wave plate, the output 201*a* of the terminal 200 will be circularly polarised.

FIG. 6 schematically illustrates the behaviour of the terminal 200 comprising polarisation rotation arrangement 200 with regard to the input light beam 201*a-e*. The input light beam to the terminal 200 is right-handed circularly polarised light (from the point of view of the receiving terminal 200), having been transmitted by a similar terminal as left-handed circularly polarised light (from the point of view of the source terminal). The polarisation rotation arrangement 240 is configured as in FIG. 5: the quarter-wave plate is oriented at 57.5° and the Faraday rotator imparts a 12.5° rotation on incident light.

The right-hand circularly polarised input beam 201*a* received at the quarter-wave plate 205 is converted to a linearly polarised input beam 201*b* with an orientation of polarisation of 12.5°. The linearly polarised input beam 201*b* is received by the Faraday rotator 210 which imparts a rotation of 12.5° to produce a linearly polarised input beam 201*c* with an orientation of polarisation of 25°. The linearly polarised input beam 201*c* with an orientation of polarisation of 25° is received at the polarising beam splitter 215, whereupon a portion having a vertical polarisation is reflect as input beam 201*e* to the first arm 220, and a portion having a horizontal polarisation is transmitted as input beam 201*d* to the second arm 230. Because the orientation of polarisation of the input beam 201*c* is 25°, and therefore has a polarisation which is more vertically polarised than horizontally polarised, it is not split into equal portions by the polarising beam splitter and the first arm 220 receives a larger portion of the input light than the second arm.

In general, the split ratio SR at the polarising beam splitter, described as a ratio of % T:% R where % T is the percentage transmitted and % R is the percentage reflected, can be described by the equation:

$$SR(\% \ T{:}\% \ R) = 100 \cos d(2R_F)^2{:}100 \sin d(2R_F)^2 \quad (1)$$

where cos d, sin d are cos and sin functions taking input values in degrees, and $R_F$ is the Faraday rotation in degrees. From inspection of Equation 1, there is a split ratio (i.e. % R≠0, % T≠0) when the Faraday rotation $R_F$ is not 0 or 45 degrees, which corresponds to light being provided to both the first arm and the second arm.

The invention can therefore provide a dynamically controllable split of light between the first arm and the second arm whilst maintaining a circularly polarised output beam by using the controller 275 to determine a Faraday rotation of the Faraday rotator 210 and appropriately align the quarter-wave plate to be 45 degrees from the output of the Faraday rotator 210. Varying the portion of light provided to the first 220 and second arm 230 thereby changes the portion of light provided to the communication system (receiver) and the tracking system (beam position detector), which improves the flexibility of the terminal 200.

Figure 7:
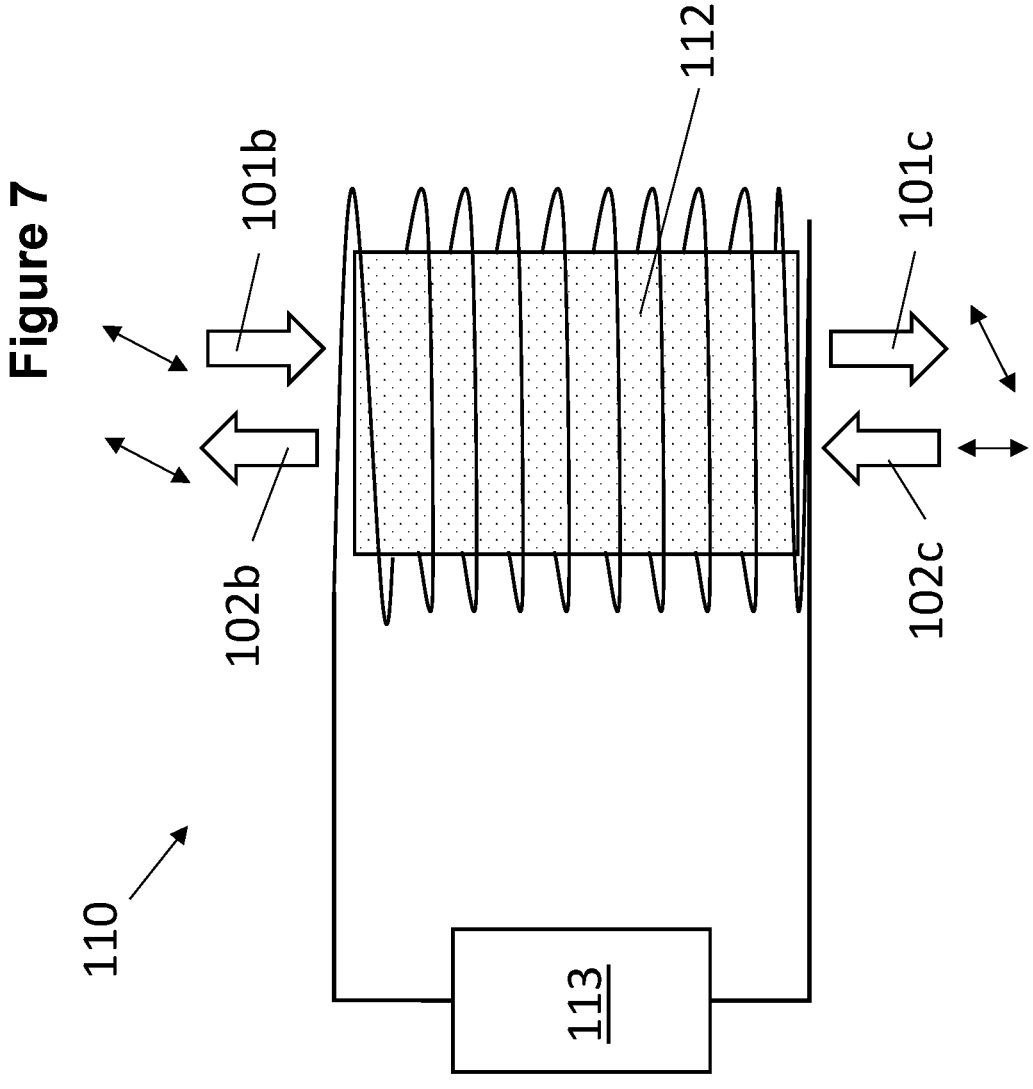
FIG. 7 is a schematic diagram illustrating the composition of a variable Faraday rotator.

FIG. 7 schematically illustrates a variable Faraday rotator 110 according to examples. A magneto-optic glass element 112 is surrounded by an electromagnetic system 113. The current through the electromagnetic system 113 can be varied to change the magnetic field the magneto-optic glass element 112 is subject to. An output beam 102*c* having a vertical polarisation is incident upon the magneto-optic glass element 112 of the variable Faraday rotator 110, whereupon the polarisation state is rotated by an amount determined by the strength of the magnetic field produced by the electromagnetic system 113 and the material properties of the magneto-optic glass element 112. The output beam 102*c* emerges as a rotated output beam 102*b*, the two output beams having different orientations of polarisation. Similarly, an input beam 101*b* having, for explanatory purposes, the same state of polarisation as rotated output beam 102*b*, is incident upon the magneto-optic glass element 112 of the variable Faraday rotator 110. The orientation of polarisation is rotated in the same direction, and the input beam 101*b* emerges as a rotated input beam 101*c*, having a different orientation of polarisation to both the input beam 101*b* and also the output beam 102*c*.

Figure 8:
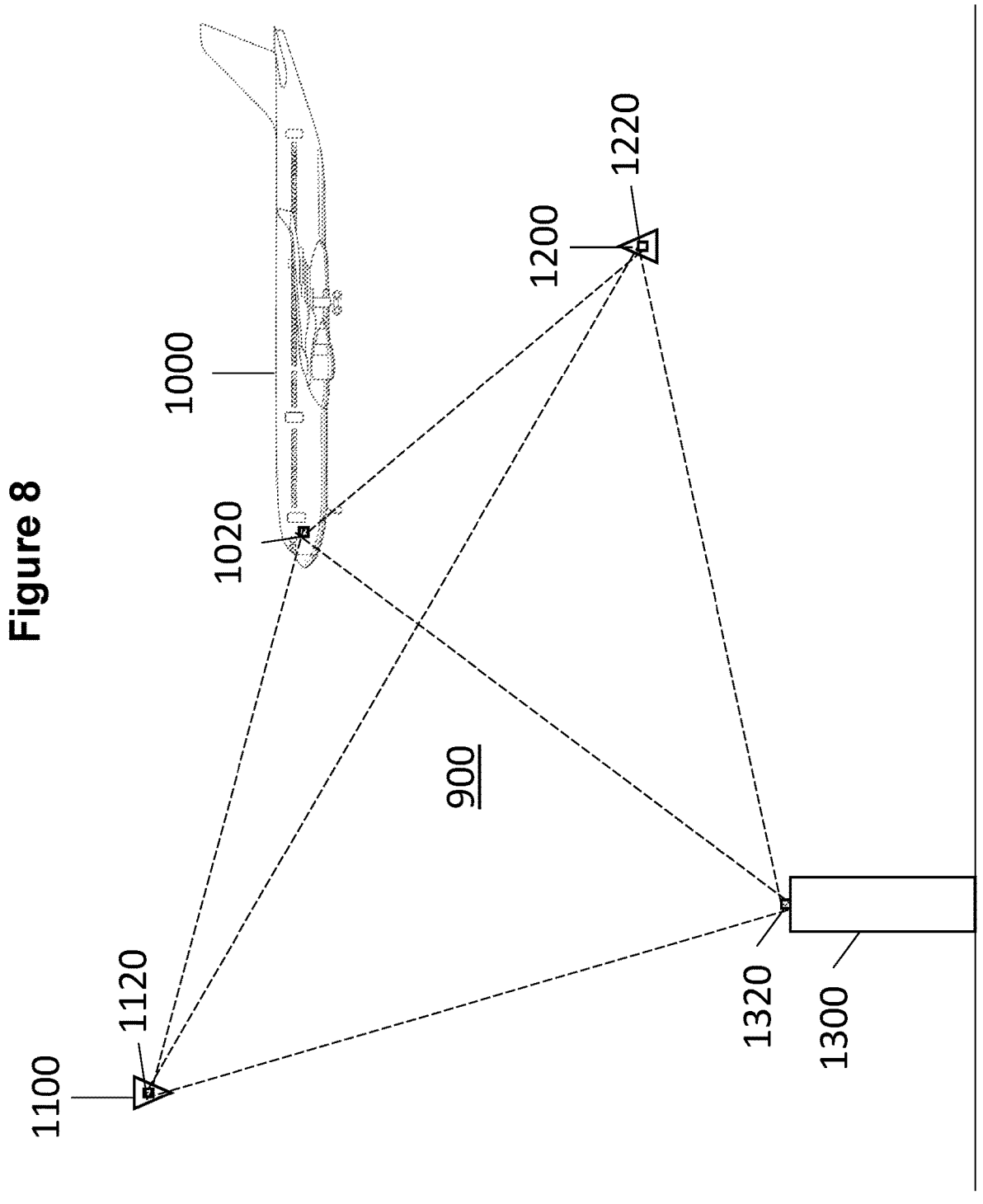
FIG. 8 illustrates schematically a plurality of free space optical communications terminals according to the present invention forming a communication network between vehicles and a ground structure.

FIG. 8 schematically illustrates a free space optical communications system comprising a network 900 of communicating nodes, each node comprising a terminal according to examples of the present invention. An aircraft 1000 is equipped with a terminal 1020, a pseudo-satellite 1110 is equipped with a terminal 1120, a drone 1200 is equipped with a terminal 1220 and a ground structure 1300 is equipped with a terminal 1320. In this example, all terminals 1020, 1120, 1220, 1320 are identical to one another, but in other examples each terminal of the network may comprise an identical optical arrangement but utilise different equipment with which to utilise the received beam or produce a transmitted beam. For example, the ground structure may comprise a more powerful optical source such that it can effectively continuously communicate with the pseudo-satellite 1100, aircraft 1000 and drone 1200, whereas, for example, the drone may only be required to intermittently communicate with the ground structure, and so is equipped with a less heavy optical source with smaller power requirements.

FIGS. 9 and 10 are flowcharts depicting general steps for communicating using the terminals of the previously presented examples.

FIG. 9 illustrates steps in a transmit direction. At step S101, an output beam encoding information is generated by the transmitter, laser source 128. By transiting the polarising beam splitter 115 and being reflected, the output beam has a first linear polarisation. In some examples, the output beam is produced by the laser source 128 with a linear polarisation.

At step S103, the output beam, having a first linear polarisation, is rotated to a second linear polarisation. This is performed by the Faraday rotator.

At step S105, the output beam, having a second linear polarisation after rotation by the Faraday rotator, is transformed to a circularly polarised output beam by the quarter-wave plate. This circular polarisation may be right- or left-handed, depending on the precise arrangement of the optical components of the terminal.

As step S107, this beam is transmitted to a target. This target may be another terminal according to the invention or may be a terminal having a different configuration.

FIG. 10 illustrates steps in a receive direction. At step S151, an input beam encoding information to be communicated is received. This beam may be received by another terminal according to the invention or may be a terminal having a different configuration.

At step S153 the input beam having, in this example, a circular polarisation, is transformed to a third linear polarisation by the quarter-wave plate.

At step S155, the input beam is rotated from the third linear polarisation to a fourth linear polarisation by the Faraday rotator.

At step S157, the input beam having a fourth linear polarisation is split between the first and second arm by the polarising beam splitter.

In examples where the Faraday rotator is variable, the method may further include a step of determining a desired split ratio between first and second arms. Such a determination may occur based on a pre-programmed protocol, for example, or by actively tracking the input power required by equipment utilising the received beam. The rotation induced by the Faraday rotator and the alignment of the quarter-wave plate can be modified to produce the desired split ratio, as described for FIGS. 5 and 6.

The above embodiments are to be understood as illustrative examples of the invention. Further embodiments of the invention are envisaged.

For example, in the description thus far the components of the polarisation rotation arrangement 140 have been configured such that the terminal produces a circularly polarised beam, and the optical behaviour of the terminal with regards to received light has been described in terms of circularly polarised light.

The terminal may be configured to produce elliptically polarised light instead, for example by having the output light rotated by the Faraday rotator being at angle other than 45 degrees to the fast-axis of the quarter-wave plate. This 45-degree angle may instead be, for example, 44 degrees, in which case the output light will be slightly elliptically polarised, due to accidental misalignment of the optical components.

Similarly, a terminal according to the present invention receiving such elliptically polarised light would convert, at the quarter-wave plate, the elliptically polarised light to either linearly polarised light or a different elliptically polarised light, dependent on, for example, the precise position of the source of the received beam. Atmospheric conditions may equally change the polarisation state of a circularly transmitted beam to an elliptical state of polarisation. The received elliptically polarised light may still be portioned into a first portion and a second portion at the polarising beam splitter, thereby providing both arms with received light, but the power level of each portion may fluctuate as, for example, the position of the source or the terminal itself changes. As a result, the invention may also be used in the presence of elliptically polarised output and received light.

Similarly, the steps of the method described by FIGS. 9 and 10 need not transmit and receive a circularly polarised beam, but may instead produce a beam having a third polarisation, and receive a beam having a fourth polarisation which is subsequently transformed at step S153 to a fifth polarisation and rotated to a sixth polarisation at step S155.

The second arm has been described as comprising a beam positioning sensing detector. In other examples, additionally or instead of a beam positioning sensing detector, the second arm could comprise components which utilise the beam in other ways—for example, a beam profiler to measure the spatial profile quality of the beam, or a spectrometer to measure beam wavelength properties. In other examples still, the second arm could feature second transmit/receive components which could be used to provide redundancy and improve reliability of the terminal.

In previous examples, an optical circulator has provided isolation between the transmitter and receiver. In other examples, transmit and receive beams may have different wavelengths and so optical isolation may be provided by, for example, a dichroic mirror, which transmits a first wavelength of light and reflects a second wavelength of light.

There has been described so far only one Faraday rotator provided in a terminal. In other examples multiple Faraday rotators may be arranged in series, for example where the rotation induced by a single Faraday rotator is not large enough to induce a required rotation. In some examples, a subset of the Faraday rotators are used to induce smaller rotations, whereas in other examples still, a desired rotation is brought about by the totality of the series of Faraday rotators.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A free space optical communications terminal comprising:

a quarter-wave plate;

a Faraday rotator comprising an electromagnetic element;

a polarisation splitter, a first arm comprising a receiver and a transmitter; and a second arm comprising a component configured to utilise a received beam;

wherein the quarter wave plate, the Faraday rotator, and the polarisation splitter are arranged along a principal axis of the free-space optical communications terminal and are configured for a received circularly polarised beam incident on the quarter-wave plate;

wherein the quarter-wave plate converts the received circularly polarised beam to a received linearly polarised beam;

wherein the Faraday rotator rotates a polarisation of the received linearly polarised beam to produce a rotated received linearly polarised beam;

the polarisation splitter provides a first portion of the rotated received linearly polarised beam to the first arm and a second portion of the rotated received linearly polarised beam to the second arm;

wherein for a transmitted beam produced by the transmitter of the first arm and incident on the polarisation splitter, the polarisation splitter provides a transmitted linearly polarised beam to the Faraday rotator;

wherein the Faraday rotator rotates a polarisation of the transmitted linearly polarised beam to produce a rotated transmitted linearly polarised beam;

wherein the quarter-wave plate converts the rotated transmitted linearly polarised beam to an output beam with an output polarisation, and wherein a strength of a magnetic field applied by the electromagnetic element to the input beam is variable such the rotation of the polarisation imparted by the Faraday rotator to the input beam is variable.

2. The free space optical communications terminal according to claim 1, wherein the quarter-wave plate, the Faraday rotator, and the polarisation splitter are configured such that the output polarisation is circular.

3. The free space optical communications terminal according to claim 1, wherein the quarter-wave plate, the Faraday rotator, and the polarisation splitter are configured such that the first portion is equal to the second portion.

4. The free space optical communications terminal according to claim 1, wherein the component configured to utilise the received beam includes a beam position sensing detector.

5. The free space optical communications terminal according to claim 4, wherein the beam position sensing detector includes a quadrant tracking detector.

6. The free space optical communications terminal according to claim 1, wherein the first arm further comprises an optical circulator, the transmitter is configured to address a first port of the optical circulator;

the polarisation splitter is configured to address a second port of the optical circulator; and the receiver is configured to address a third port of the optical circulator, wherein:

light received from the first arm is directed by the optical circulator to the receiver which includes an optical detector; and light produced by the transmitter in the first arm is directed by the optical circulator to the polarisation splitter.

7. The free space optical communications terminal according to claim 1, wherein a fast axis of the quarter-wave plate is variable.

8. The free space optical communications terminal according to claim 1, wherein the quarter-wave plate is rotatably mounted, and a fast axis of the quarter-wave plate is maintained at a fixed rotational displacement from an output polarisation of the Faraday rotator.

9. The free space optical communications terminal according to claim 8, wherein the fast axis of the quarter-wave plate is aligned 45 degrees from the output polarisation of the Faraday rotator.

10. The free space optical communications terminal according to claim 1, further a comprising beam steering device configured to modify a beam path.

11. The free space optical communications terminal according to claim 1, further comprising a beam steering device, the component configured to utilise the received beam includes a beam position sensing detector configured to providing steering information, and wherein the beam steering device modifies a beam path through the free space optical communications terminal based on the steering information.

12. A free space optical communications system, comprising a plurality of the free space optical communications terminal recited in claim 1.

13. A vehicle comprising the free space optical communications terminal according to claim 1.

14. A method for free space optical communications using a terminal including a quarter-wave plate; a Faraday rotator; a polarisation splitter; a first arm comprising a receiver and a transmitter; and a second arm comprising a component configured to utilise a received beam; the method comprising:

generating, using the transmitter, an output beam of light encoding information to be communicated, the output beam having a first linear polarisation;

rotating, using the Faraday rotator, the output beam from a first linear polarisation to a second linear polarisation; and transforming, using the quarter-wave plate, the output beam from a second linear polarisation to a third polarisation to be transmitted to a target;

receiving an input beam of light encoding information to be communicated, the input beam having a fourth polarisation;

transforming, using the quarter-wave plate, the input beam from the fourth polarisation to a fifth polarisation;

rotating, using the Faraday rotator, the input beam from the fifth polarisation to a sixth polarisation;

splitting, using the polarisation splitter, the input beam between the first arm and the second arm and receiving a portion of the input beam at the receiver, and transforming, using the quarter-wave plate, and rotating, using the Faraday rotator, the input beam to change a ratio of the input beam split during the splitting of the input beam between the first arm and the second arm.

15. The method according to claim 14, wherein:

the third polarisation is a circular polarisation, the fourth polarisation is a circular polarisation, or the fifth and sixth polarisations are linear polarisations.

* * * * *